United States Patent [19]

Paik et al.

[11] Patent Number: 5,311,546
[45] Date of Patent: May 10, 1994

[54] CARRIER PHASE RECOVERY FOR AN ADAPTIVE EQUALIZER

[75] Inventors: Woo H. Paik, Encinitas; Scott A. Lery, Leucadia; Adam S. Tom, La Jolla, all of Calif.

[73] Assignee: General Instrument Corporation, Hatboro, Pa.

[21] Appl. No.: 53,962

[22] Filed: Apr. 27, 1993

Related U.S. Application Data

[63] Continuation of Ser. No. 733,790, Jul. 26, 1991, abandoned.

[51] Int. Cl.$^5$ .................. H04B 3/04; H04L 27/06
[52] U.S. Cl. ........................... 375/14; 375/97; 364/724.2
[58] Field of Search .................. 375/11, 12, 13, 14, 375/39, 80, 81, 97; 364/724.2

[56] References Cited

U.S. PATENT DOCUMENTS

| | | | |
|---|---|---|---|
| 3,694,752 | 9/1972 | Gibson | 375/14 |
| 4,227,152 | 10/1980 | Godard et al. | |
| 4,672,631 | 6/1987 | Suzuki et al. | 375/14 |
| 4,712,221 | 12/1987 | Pearce et al. | 375/14 |
| 4,718,073 | 1/1988 | Takaoka | 375/14 |
| 4,736,386 | 4/1988 | Nichols | |
| 4,815,103 | 3/1989 | Cupo et al. | 375/14 |
| 4,856,031 | 8/1989 | Goldstein | 375/11 |
| 4,987,375 | 1/1991 | Wu et al. | |
| 5,113,142 | 6/1992 | Yoshikawa | 375/80 |

OTHER PUBLICATIONS

Bingham, J. A. C., "The Theory and Practice of Modem Design," *A Wiley-Interscience Publication*, 1988, pp. 178-182.
Godard, D. N., "Self-Recovering Equalization and Carrier Tracking in Two-Dimensional Data Communication Systems," *IEEE Transactions on Communications*, vol. COM-28, No. 11, Nov. 1980, pp. 1867-1875.
Bacceetti, et al., "Full Digital Adaptive Eaualization in 64-QAM Radio Systems," *IEEE Journal on Selected Areas in Communications*, vol. SAC-5, No. 3, Apr. 1987, New York, pp. 466-475.
Chamberlin, et al., "Design and Field Test of a 256-QAM DIV Modem," *IEEE Journal on Selected Areas in Communications*, vol. SAC-5, No. 3, Apr. 1987, New York, pp. 349-356.
Matsuo, et al., "Carrier Recovery Systems for Arbitrarily Mapped APK Signals," *IEEE Transactions on Communications*, vol. COM-30, No. 10, Oct. 1982, pp. 2385-2390.
Logan, et al., "A MOS/LSI Multiple-Configuration 9600 BPS Data Modem," *IEEE International Conference on Communications-ICC76*, Jun. 14-16, 1976, Pennsylvania, vol. 3, pp. 48-7-48-12.

*Primary Examiner*—Stephen Chin
*Assistant Examiner*—Vijay Shankar
*Attorney, Agent, or Firm*—Barry R. Lipsitz

[57] ABSTRACT

A method and apparatus are provided for adaptively equalizing data signals in a communications receiver. An unequalized data signal is demodulated. The demodulated data signal is filtered in an adaptive equalizer that initially updates adaptive filter coefficients using error signals derived from a first algorithm. A carrier lock signal is generated when a phase error of a filtered signal output from the adaptive equalizer reaches a threshold value. The adaptive filter coefficients are updated using error signals derived from a second algorithm instead of the first algorithm in response to the carrier lock signal. The first algorithm is a self-recovering equalization algorithm such as the Constant Modulus Algorithm. The second algorithm can be a decision directed algorithm. Carrier phase is recovered without the use of a phase rotator or phase de-rotator, by locating the adaptive equalizer inside of the carrier recovery loop. The invention is particularly adapted for use in the recovery of multilevel amplitude modulated data, such as QAM data.

20 Claims, 5 Drawing Sheets

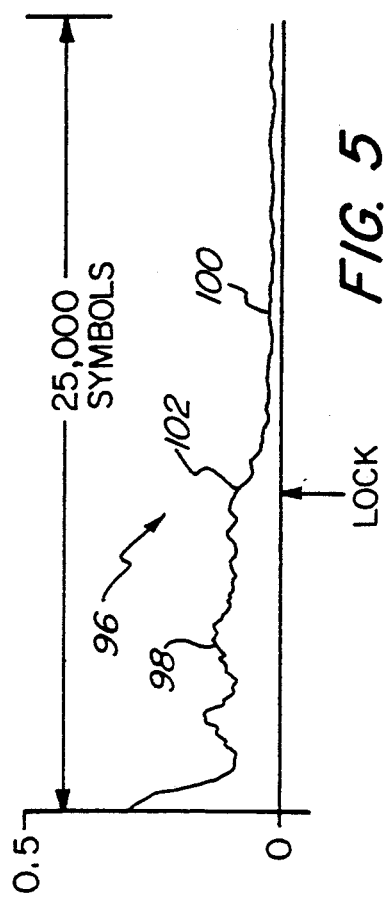
FIG. 5
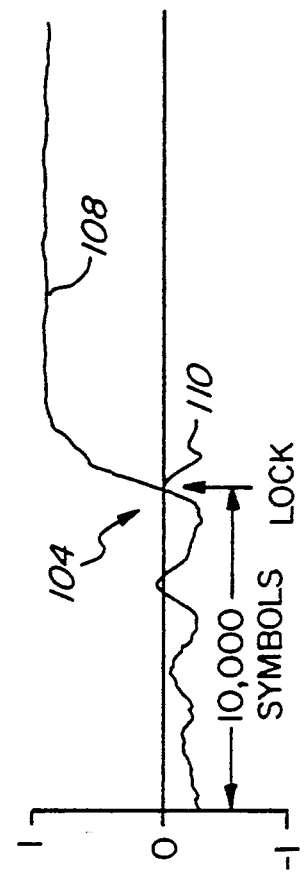
FIG. 6
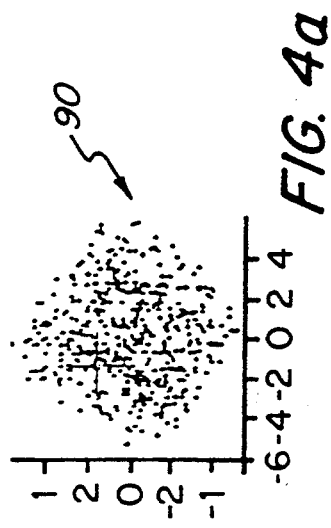
FIG. 4a
FIG. 4b
FIG. 4c

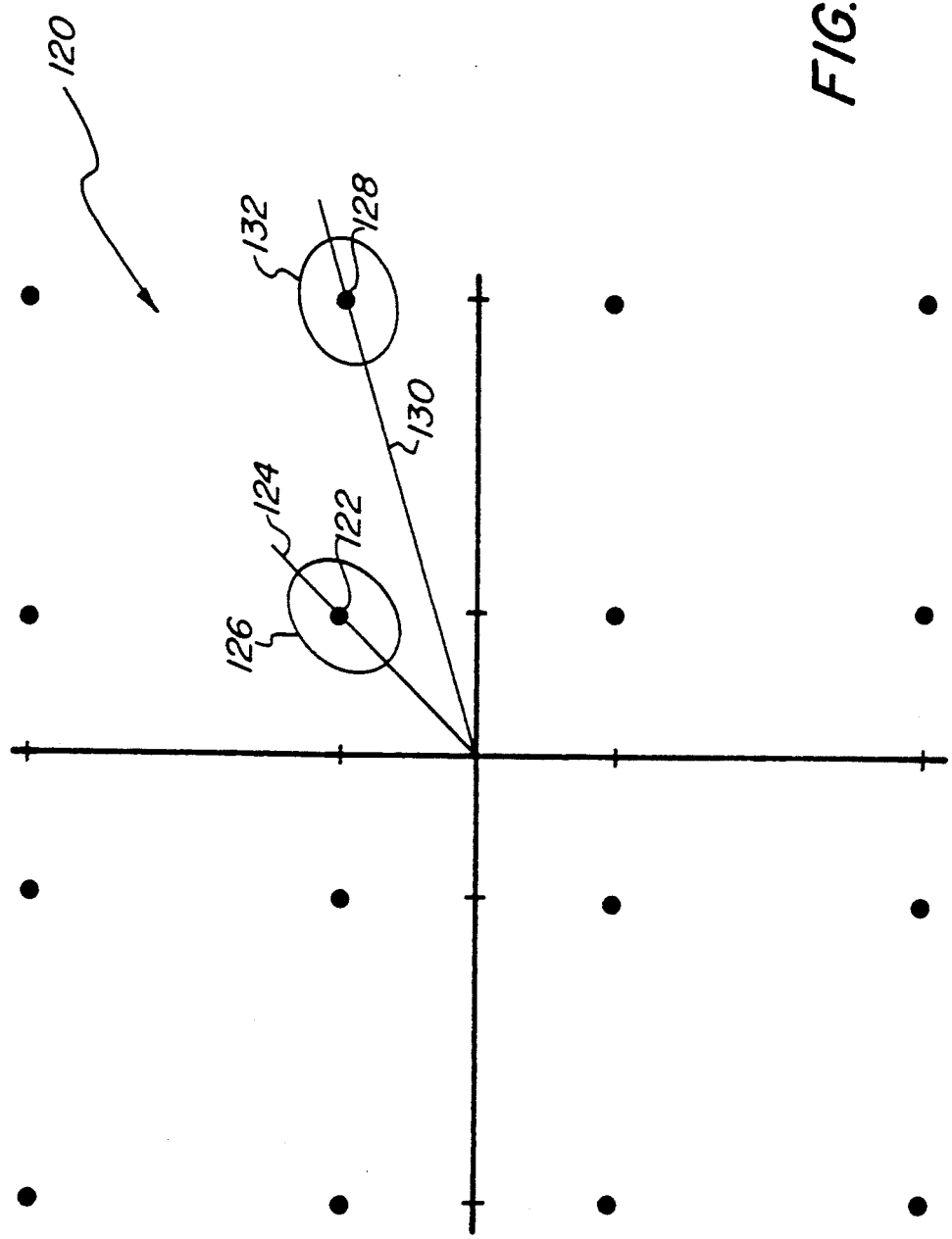

CARRIER PHASE RECOVERY FOR AN ADAPTIVE EQUALIZER

This application is a continuation of commonly assigned, copending U.S. patent application Ser. No. 07/73,790, filed Jul. 26, 1991 now abandoned.

BACKGROUND OF THE INVENTION

The present invention relates to digital communications, and more particularly to a method and apparatus for recovering carrier phase in an adaptive equalizer without the use of phase rotation or de-rotation.

Digital data, for example digitized video for use in broadcasting high definition television (HDTV) signals, can be transmitted over terrestrial very high frequency (VHF) or ultra high frequency (UHF) analog channels for communication to end users. Analog channels deliver corrupted and transformed versions of their input waveforms. Corruption of the waveform, usually statistical, may be additive and/or multiplicative, because of possible background thermal noise, impulse noise, and fades. Transformations performed by the channel are frequency translation, nonlinear or harmonic distortion, and time dispersion.

In order to communicate digital data via an analog channel, the data is modulated using, for example, a form of pulse amplitude modulation (PAM). Typically, quadrature amplitude modulation (QAM) is used to increase the amount of data that can be transmitted within an available channel bandwidth. QAM is a form of PAM in which a plurality of bits of information are transmitted together in a pattern referred to as a "constellation", which can contain, for example, sixteen or thirty-two points.

In pulse amplitude modulation, each signal is a pulse whose amplitude level is determined by a transmitted symbol. In 16-QAM, symbol amplitudes of $-3, -1, 1$ and 3 in each quadrature channel are typically used. In bandwidth efficient digital communication systems, the effect of each symbol transmitted over a time-dispersive channel extends beyond the time interval used to represent that symbol. The distortion caused by the resulting overlap of received symbols is called intersymbol interference (ISI). This distortion has been one of the major obstacles to reliable high speed data transmission over low background noise channels of limited bandwidth. A device known as an "equalizer" is used to deal with the ISI problem.

In order to reduce the intersymbol interference introduced by a communication channel, rather precise equalization is required. Furthermore, the channel characteristics are typically not known beforehand. Thus, it is common to design and use a compromise (or a statistical) equalizer that compensates for the average of the range of expected channel amplitude and delay characteristics. A least mean square (LMS) error adaptive filtering scheme has been in common use as an adaptive equalization algorithm for over 20 years. This algorithm is described in B. Widrow and M. E. Hoff, Jr., "Adaptive Switching Circuits" in IRE Wescon Conv. Rec., Part 4, pp. 96–104, Aug. 1960. The use of the LMS algorithm in an adaptive equalizer to reduce intersymbol interference is discussed in S. U. H. Qureshi, "Adaptive Equalization", *Proc. IEEE*, Vol. 73, No. 9, pp. 1349–1387, September 1987.

In an LMS equalizer, the equalizer filter coefficients are chosen to minimize the mean square error, i.e., the sum of squares of all the ISI terms plus the noise power at the output of the equalizer. Therefore, the LMS equalizer maximizes the signal-to-distortion ratio at its output within the constraints of the equalizer time span and the delay through the equalizer. Before regular data transmission begins, automatic synthesis of the LMS equalizer for unknown channels may be carried out during a training period. This generally involves the iterative solution of a set of simultaneous equations. During the training period, a known signal is transmitted and a synchronized version of the signal is generated in the receiver to acquire information about the channel characteristics. The training signal may consist of periodic isolated pulses or a continuous sequence with a broad, uniform spectrum such as a widely known maximum length shift register or pseudo-noise sequence.

An important aspect of equalizer performance is its convergence, which is generally measured by the amount of time in symbol periods required for the error variance in the equalizer to settle at a minimum level, which is ideally zero. In order to obtain the most efficient operation for a data receiver, the equalizer convergence time must be minimized.

After any initial training period, the coefficients of an adaptive equalizer may be continually adjusted in a decision directed manner. In this mode, the error signal is derived from the final receiver estimate (not necessarily correct) of the transmitted sequence. In normal operation, the receiver decisions are correct with high probability, so that the error estimates are correct often enough to allow the adaptive equalizer to maintain precise equalization. Moreover, a decision directed adaptive equalizer can track slow variations in the channel characteristics or linear perturbations in the receiver front end, such as slow jitter in the sampler phase.

Many transmission systems employ modulation schemes that are constructed with complex signal sets. In other words, the signals are viewed as vectors in the complex plane, with the real axis called the inphase (I) channel and the imaginary axis called the quadrature (Q) channel. Consequently, when these signals are subjected to channel distortion and receiver impairments, cross talk between the I and Q channels occurs, requiring a complex adaptive equalizer. In this case, the equalizer's coefficients will be complex valued. If, as noted above, the channel distortion is unknown by the receiver, then the coefficients must be adjusted after the system has been in operation to cancel the channel distortion. The term "adaptive" in a complex adaptive equalizer signifies the ongoing adjustment of the coefficients.

In many practical transmission systems, some method must be provided to derive a reference signal at the receiver's demodulator that is phase coherent with the received signal. Such coherent demodulators are used to demodulate signals containing information in their phase. For example, in binary phase shift keying (BPSK), modulation of a digital "one" is represented by a phase of zero degrees and modulation of a "zero" is represented by a phase of 180 degrees in the modulated signal. Data modulated using QAM techniques is demodulated on the basis of similar, although more complicated, phase relationships. Thus, demodulators for such data rely on a reference signal that must be synchronized in phase with the data carrier. This process is known as carrier phase recovery (CPR).

A phase locked loop (PLL) is a common and well known method used to recover the carrier in signal demodulators. When used in such applications, the PLL is sometimes referred to as a carrier recovery loop (CRL). When an adaptive equalizer is employed, it has been common practice to locate the CRL after the equalizer in the receiver. A free running oscillator is used to translate the input signal frequency to baseband, and a phase rotator is required to recover the carrier phase. In addition, a phase de-rotator is required in the adaptive equalizer to provide a correctly phased error signal for use in updating the filter coefficients. The requirement for a phase rotator and de-rotator complicates the receiver design, and adds expense to the receiver circuitry.

It would be advantageous to provide a method for recovering carrier phase in systems employing adaptive equalization without the need for phase rotation and de-rotation hardware. It would be further advantageous to provide an adaptive equalizer for a communications receiver that can initially adjust the equalizer coefficients in the absence of carrier phase recovery, thereby reducing the acquisition time of the system. Reduction of the system complexity by using self-recovering equalization algorithms that do not require a training sequence would be further advantageous. Such a system would be able to commence equalization without waiting for carrier recovery to occur.

The present invention provides a method and apparatus enjoying the aforementioned and other advantages.

SUMMARY OF THE INVENTION

In accordance with the present invention, a method is provided for adaptively equalizing data signals in a communications receiver An unequalized data signal is demodulated. The demodulated data signal is filtered in an adaptive equalizer that initially updates adaptive filter coefficients using error signals derived from a first algorithm. A carrier lock signal is generated when a phase error of a filtered signal output from the adaptive equalizer reaches a threshold value. The adaptive filter coefficients are updated in the adaptive equalizer using error signals derived from a second algorithm instead of the first algorithm in response to the carrier lock signal.

In a preferred embodiment, the phase error is monitored during the operation of the adaptive equalizer, and the first algorithm takes over if it is determined during the monitoring step that the phase error no longer meets the threshold Advantageously, the first algorithm will be a self-recovering equalization algorithm, such as a constant modulus algorithm. The second algorithm is advantageously a decision directed algorithm The phase error threshold is reached when at least a minimum percentage of samples of the filtered signal taken over time fall within a predetermined range. In an embodiment where the demodulated data signal comprises coordinates representing an N-bit constellation pattern for a demodulated N-bit quadrature amplitude modulated signal, the range can comprise a plurality of separate fixed areas, each area enclosing one of the constellation points. The separate fixed areas can comprise, for example, an ellipse surrounding a constellation point. In an illustrated embodiment, the ellipse is aligned with a corresponding radius extending from an origin of the constellation pattern to the constellation point the ellipse surrounds.

An adaptive equalizer for a communications receiver in accordance with the present invention comprises means for demodulating an unequalized data signal. An equalizer loop contains a filter coupled to receive demodulated data from the demodulating means, an error signal generator coupled to receive filtered data from the filter, and means responsive to error signals from the error signal generator for updating coefficients for input to the filter. A carrier recovery loop comprises a phase detector coupled to receive the filtered data and provide a first phase error signal for controlling the demodulator. Means, coupled to receive a second phase error signal from the phase detector, generate a carrier lock signal when the second phase error signal meets a threshold. The error signal generator is responsive to the carrier lock signal for generating error signals from a first algorithm when the second phase error signal fails to meet the threshold and for generating error signals from a second algorithm when the second phase error signal meets the threshold The error signal generator can comprise, for example, a memory storing a first set of error signals computed using the first algorithm and a second set of error signals computed using the second algorithm. In such an embodiment, the filtered data and the carrier lock signal are used to address the memory to output error signals Preferably, the first algorithm will be a self- o recovering equalization algorithm, such as a constant modulus algorithm. The second algorithm can be a decision directed algorithm. The phase error threshold will be met when at least a minimum percentage of samples of the filtered signal taken over time fall within a predetermined range. In an illustrated embodiment, the demodulated data signal comprises coordinates representing an N-bit constellation pattern for a demodulated N-bit quadrature amplitude modulated signal. The predetermined range for determining whether the threshold is met comprises a plurality of separate fixed areas, each enclosing one of the constellation points. Each of the separate fixed areas can comprise an ellipse surrounding a constellation point, each ellipse being aligned with a corresponding radius extending from an origin of the constellation pattern to the constellation point the ellipse surrounds.

The present invention also provides an adaptive equalizer for a communications receiver wherein an adaptive filter is provided for filtering unequalized data representative of coordinates in a constellation pattern. An error signal generator converts the filtered data from the filter to error signals based on a first or second algorithm. Means are coupled to receive error signals output from the error signal generator for updating coefficients for the adaptive filter A phase detector converts filtered data from the filter to phase error signals. Means responsive to the phase error signals control the error signal generator to provide error signals according to the first algorithm when a phase error represented by the phase error signals is above a predetermined threshold Error signals are provided according to the second algorithm when the phase error is below the predetermined threshold.

The error signal generator of the adaptive equalizer can comprise a look-up table containing error signal data computed under the first and second algorithms. The look-up table is addressed by the filter data and the control means to output the error signals. The phase detector can also comprise a look-up table. This table would contain phase error data and be addressed by the filter data to output the phase error signals.

BRIEF DESCRIPTION OF THE DRAWINGS

FIGS. 4a to 4c provide three scatter plots illustrating the output of the equalizer of the present invention at different points in time;

FIG. 5 is a graph illustrating the mean square error over time of an adaptive equalizer in accordance with the present invention;

FIG. 6 is a graph illustrating a carrier lock signal provided to the adaptive equalizer of the present invention; and FIG. 7 is a graphical representation of a constellation pattern for sixteen-bit QAM data, illustrating fixed elliptical areas used to determine when a phase error threshold has been met.

DETAILED DESCRIPTION OF THE INVENTION

Figure 1:
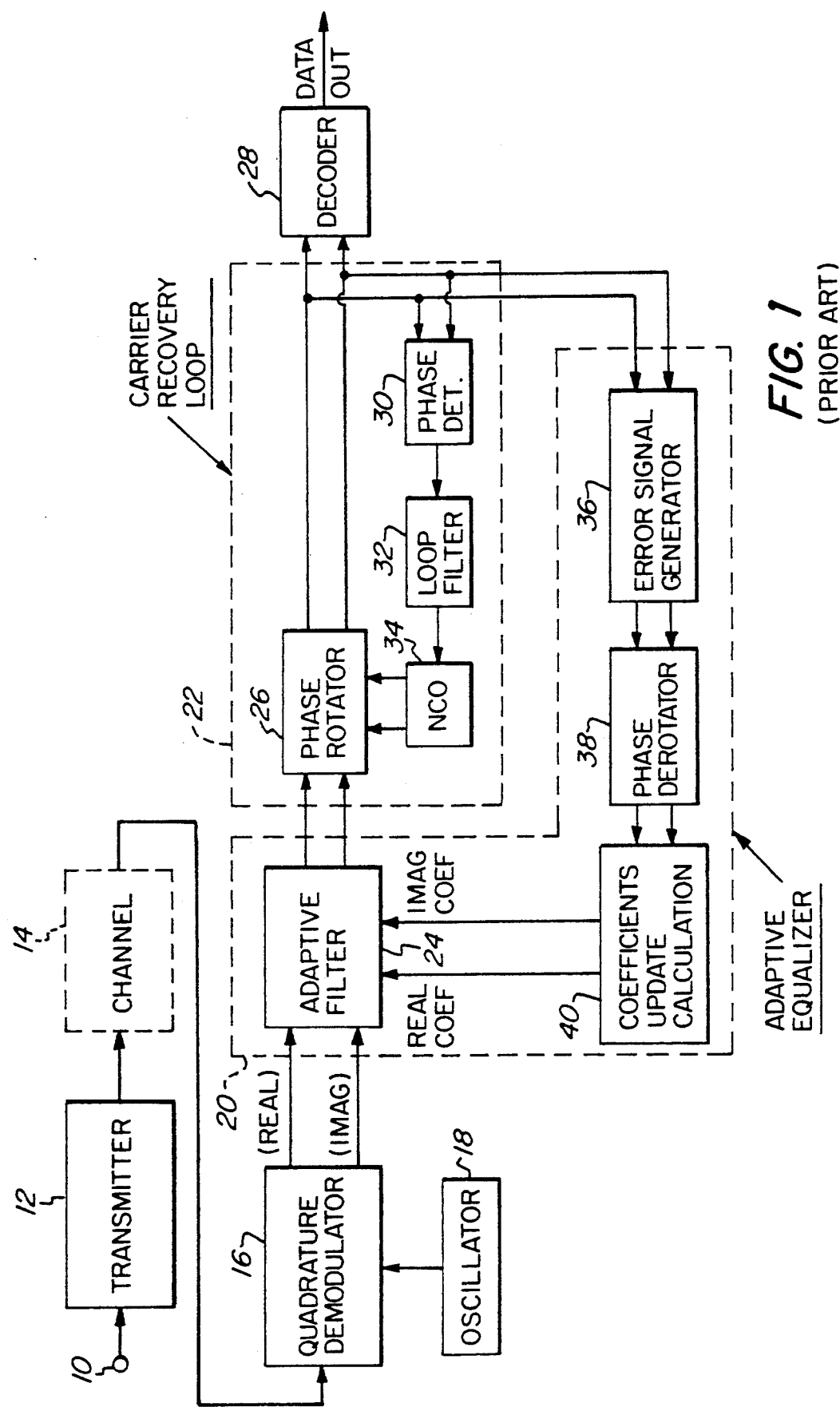
FIG. 1 is a block diagram of a prior art communications receiver illustrating an adaptive equalizer followed by a carrier recovery loop including a phase rotator.

FIG. 1 illustrates a prior art data transmission/reception system in which the communication receiver includes an adaptive equalizer followed by a carrier recovery loop using a phase rotator. Modulated digital data is input to a transmitter 12 via an input terminal 10 in a conventional manner. The transmitter broadcasts the data via a channel 14 that introduces amplitude and/or delay (phase) distortion. When the modulated data comprises multilevel pulse amplitude modulated data, such as QAM data, intersymbol interference takes place within the channel. An adaptive equalizer 20 is provided in the receiver to compensate for the intersymbol interference. The equalizer is essentially a filter with coefficients chosen to cancel the effects of the channel distortion.

The data received from channel 14 is demodulated at the receiver in a demodulator 16 that is controlled by a free running oscillator 18. In the illustrated embodiment, a quadrature demodulator is used to receive complex QAM data. The received data is demodulated to recover the real and imaginary complex components. These components are input to an adaptive filter 24 of adaptive equalizer 20. The filtered output from filter 24 is input to an independent carrier recovery loop 22. A phase rotator 26 in the carrier recovery loop shifts the phase of the filtered signals by an estimate of the phase error between a transmitted signal and a received signal. A phase detector 30 coupled to the output of phase rotator 26 generates an error signal indicative of the difference between the estimated phase shift and the actual shift introduced by channel 14. The error signal is filtered by a loop filter 32 and used as an input to a numerically controlled oscillator 34 to adjust phase rotator 26 in a manner that attempts to reduce the error signal to zero.

The output of phase rotator 26 is also coupled to an error signal generator 36 in the adaptive equalizer. An error signal is generated indicative of the amount of intersymbol interference contained in the filtered, de-modulated input signals. The phase of the error signal is de-rotated in a phase de-rotator 38, and input to a coefficients update calculation circuit 40 for use in updating the adaptive filter coefficients. In this manner, the intersymbol interference is reduced over time so that the transmitted data can be accurately decoded by a conventional decoder 28.

A problem with the prior art structure illustrated in FIG. 1 is that it is complicated and expensive, in particular because of the need to provide a phase rotator in the carrier recovery loop and a phase de-rotator in the adaptive equalizer. A typical phase rotator requires four multiplies and two additions to provide the desired phase correction. Similar operations are required in the de-rotator. Therefore, by eliminating the phase rotator and phase de-rotator, it is possible to save the hardware that performs eight multiplies and four adds.

Figure 2:
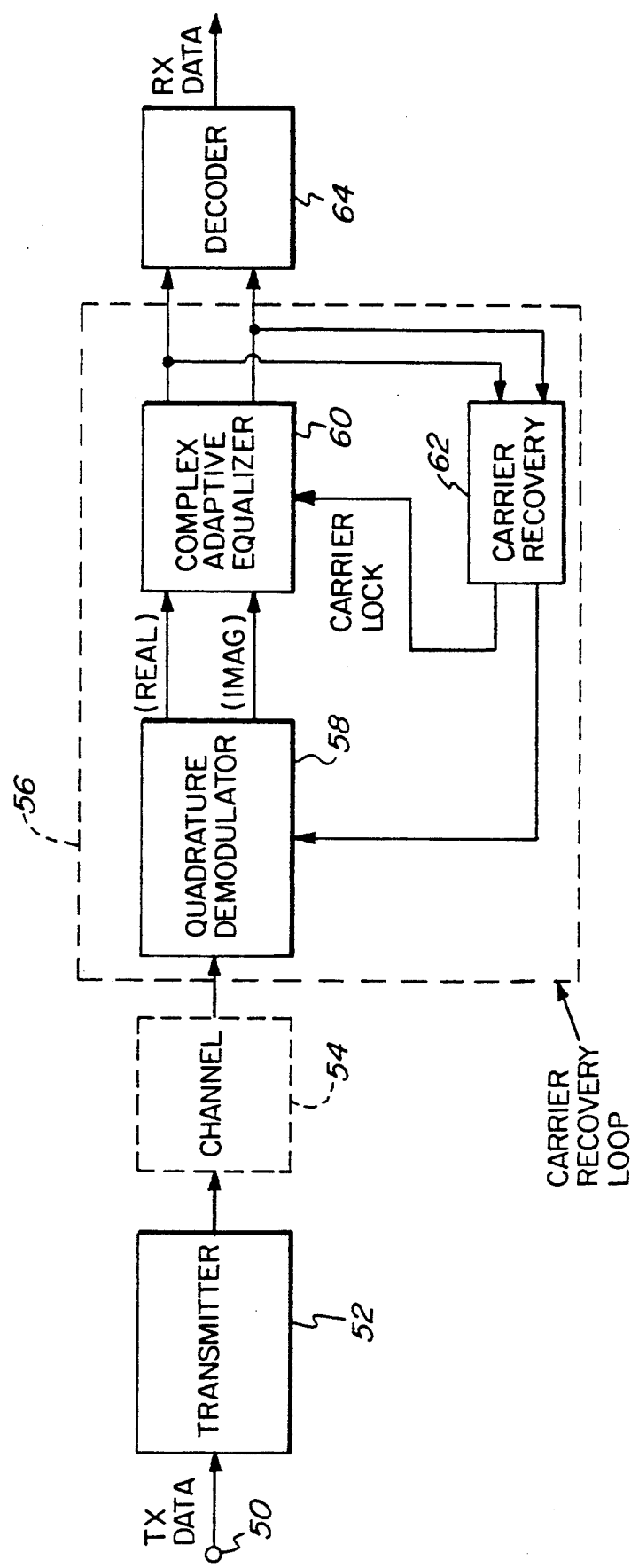
FIG. 2 is a block diagram illustrating a communication system incorporating an adaptive equalizer in accordance with the present invention.

The present invention provides an adaptive equalizer that eliminates the phase rotation and phase de-rotation components by locating the equalizer inside of the carrier recovery loop. This is illustrated in general terms in FIG. 2. As with the prior art, modulated data is input to a transmitter 52 via an input terminal 50. The data is broadcast over a channel 54, that introduces the distortions which cause intersymbol interference in the multi-level modulated data. A communications receiver in accordance with the invention uses a carrier recovery loop 56 that incorporates a demodulator 58, adaptive equalizer 60, and carrier recovery circuit 62. In the illustrated embodiment, 16-QAM data is received, and demodulator 58 is a quadrature demodulator that recovers the real and imaginary complex components from the 16-QAM data. Since complex data is provided, adaptive equalizer 60 is a complex adaptive equalizer. Carrier recovery circuit 62 provides a phase error signal to demodulator 58 and also provides a "carrier lock" signal to adaptive equalizer 60. The carrier lock signal, as discussed in greater detail below, is used to select between an intersymbol interference error signal derived from a first, self-recovering equalization algorithm such as the Constant Modulus Algorithm and a second decision directed algorithm for use in updating filter coefficients for the equalizer. A conventional decoder 64 is provided to recover individual data bits from the equalized channel data output from the adaptive equalizer.

Figure 3:
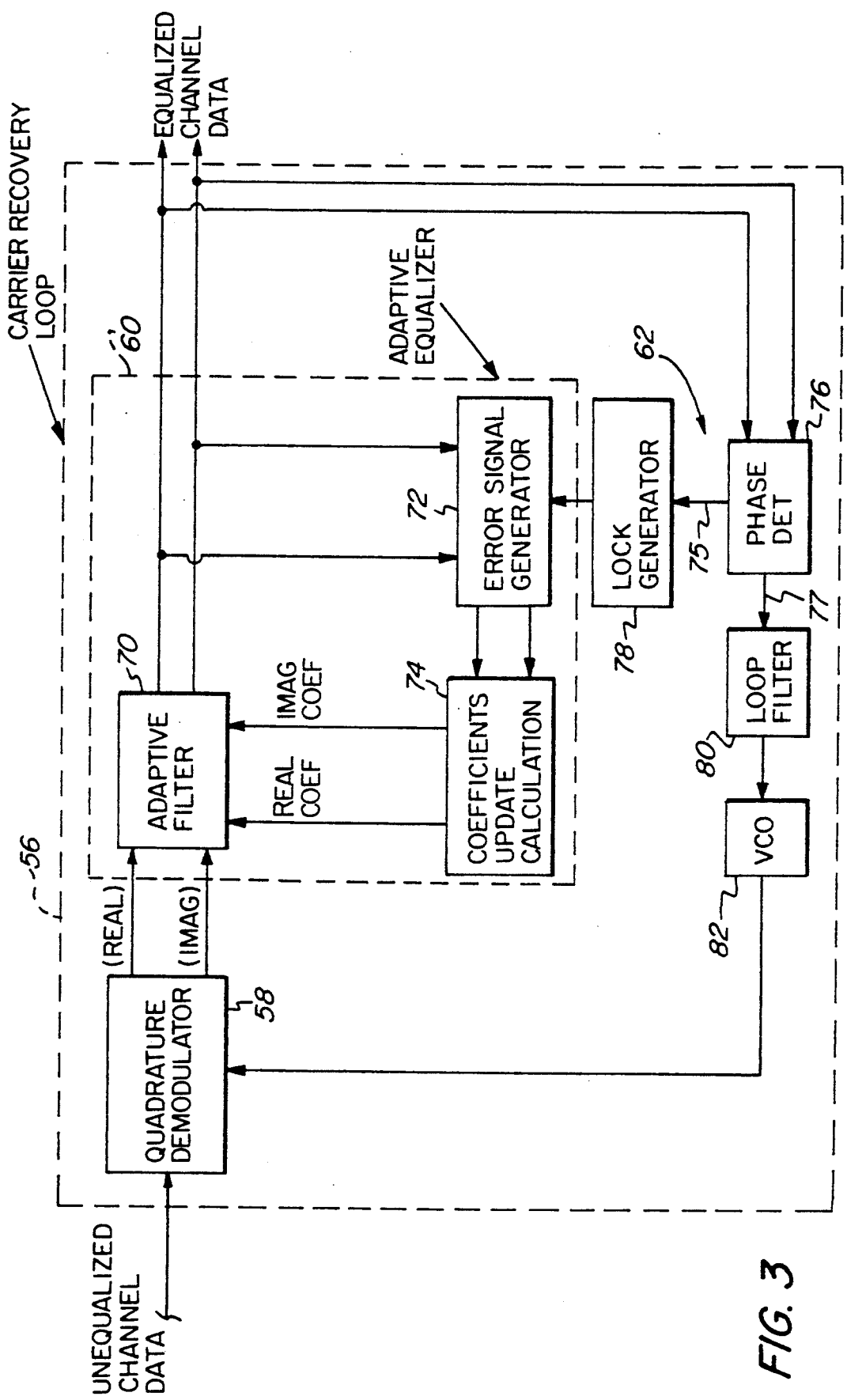
FIG. 3 is a block diagram illustrating the adaptive equalizer of the present invention in greater detail.

FIG. 3 illustrates the carrier recovery loop 56 in greater detail A phase locked loop, consisting of a phase detector 76, loop filter 80, and voltage controlled oscillator (VCO) 82 surrounds adaptive equalizer 60. The adaptive equalizer uses two least mean square (LMS) algorithms to adjust (i.e., update) the coefficients used by an adaptive filter 70. In the illustrated embodiment, the first LMS algorithm used is the Constant Modulus Algorithm (CMA) which is well known in the art and described, for example, in D. N. Godard, "Self-Recovering Equalization and Carrier Tracking in Two-Dimensional Data Communication Systems", *IEEE Trans. on Commun.*, Vol. COM-28, pp. 1867–1875, Nov. 1980. The second LMS algorithm used by the adaptive equalizer is a decision directed algorithm (DDA). The two coefficient update algorithms differ only in the way the error signal used to update the coefficients is generated. The LMS algorithm is given by:

$$C(k+1) = c(k) + \Delta E(k) X^*(k)$$

where C(k) is the complex vector of coefficients, X(k) is the complex vector of delayed data, hu * means complex conjugate, E(k) is the complex error signal, and $\Delta$ is a scale factor. For the CMA the error signal is given by:

$$E(k)_{cma} = \{|y(k)|^2 - R_2\}y(k)$$

where y(k) is the complex output of the adaptive equalizer and $R_2$ is a constant For the DDA the error signal is given by:

$$E(k)_{dda} = y'(k) - y(k)$$

where y'(k) is the "signal decision". The signal decision is based on a determination as to which constellation point a received coordinate set is closest to. Upon finding the closest constellation point to the received data point, a decision is made that the received data point corresponds to the nearest constellation point.

Adaptive equalizer 60 comprises an inner loop including error signal generator 72, coefficients update calculation circuitry 74, and adaptive filter 70. The error signal generator receives the filtered channel data from adaptive filter 70, determines the error in the filtered data (i.e., the difference between the filtered data and an ideal constellation pattern), and outputs an error signal indicative thereof for use by the coefficients update calculation circuit In response to the error signal, updated coefficients are provided to the adaptive filter 70, so that after a period of time the equalized channel data output from filter 70 will be restored to a condition from which the transmitted data can be recovered by a conventional decoder In accordance with the present invention, the CMA algorithm, which is a self-recovering equalization algorithm (also known as a blind equalization algorithm) that does not require initialization with a training sequence, is first used to adjust the coefficients until the channel data is sufficiently equalized so that carrier phase recovery can be achieved An important aspect of the CMA algorithm for purposes of the present invention is that it is independent of carrier phase recovery. The CMA algorithm provides the initial equalization necessary for the outer carrier recovery loop (phase detector 76, loop filter 80, and VCO 82) to be operational.

Like error signal generator 72, phase detector 76 also monitors the filtered data from adaptive filter 70. It determines the phase error between the filtered data and the ideal constellation pattern for the modulation scheme used. The phase error is quantized in a well known manner to provide a first phase error signal on line 77 that is processed for use by demodulator 58 in recovering the carrier phase An example of such a quantizing scheme is provided in A. Leclert and P. Vandamme, "Universal Carrier Recovery Loop for QASK and PSK Signal Sets," *IEEE Trans. on Communications,* Vol. COM-31, No. 1, Jan. 1983, pp. 130-136. The operation of the phase detector is explained in greater detail below For the present, it is noted that one output of the phase detector is coupled to loop filter 80 and VCO 82 in a conventional manner to control quadrature demodulator 58 based on the detected phase error. The operation of the carrier recovery loop will drive demodulator 58 to a point where the phase error is minimized in view of the feedback provided by the loop.

Phase detector 76 also quantizes the phase error using a second quantizing scheme to produce a second phase error signal on line 75 that is input to a carrier lock generator 78 in accordance with the present invention. Although the quantizing schemes used to generate the first and second phase error signals can be the same, it is preferable to use different schemes, wherein the scheme used to generate the first phase error signal is selected for its ease of implementation and to reduce the possibility of false lock points for QAM. The second quantization scheme is selected to provide an early indication as to when the CMA algorithm has converged Such a quantization scheme is described below in connection with FIG. 7.

Generator 78 uses a sliding average technique to determine when the phase error drops below a predetermined threshold When the threshold is met, the phase of the filtered data signal will be sufficiently close to that of the transmitted signal that accurate data recovery can commence At this point, the CMA algorithm will have served its function of self-recovery, and the DDA algorithm can be substituted to provide more efficient equalizer operation. Thus, lock generator 78 outputs a carrier lock signal to error signal generator 72 when the threshold is met. In response to the carrier lock signal, error signal generator 72 switches from the CMA method of calculating the error signals to the DDA method. In the event that the threshold is no longer met at some time during the operation of the equalizer, the carrier lock signal will turn off, and the error signal generator will switch back to the CMA algorithm. Thus, the system will automatically operate in the CMA mode when necessary, and switch over to the DDA mode as soon as the phase error has been reduced below the predetermined threshold value.

In a preferred embodiment, error signal generator 72 and phase detector 76 both comprise programmable read-only memory (PROM) devices to enable high speed operation of the equalizer e.g at symbol rates on the order of 5 MHz. The PROM used for the error signal generator will contain two sets of values. One set will comprise error signal values computed using the CMA algorithm. The other set will comprise error signal values computed using the DDA method. The filtered data input to the error signal generator PROM from adaptive filter 70 is used to address the memory and output the error signals that have been precomputed for the specific filtered data values. The carrier lock signal input to the error signal generator PROM provides an additional address signal to select between the first set of values (CMA) or second set of values (DDA) depending on whether the phase error threshold has been met.

The phase detector PROM stores two sets of precomputed phase error values corresponding to the possible filtered data values output from adaptive filter 70. One set of phase error values represents quantized values according to the first quantizing scheme discussed above, and the other set of phase error values corresponds to the quantized values provided by the second quantizing scheme discussed above and explained in further detail in connection with FIG. 7. The filtered data values are used to address the phase detector PROM, and output the first and second phase error signals associated with the particular filtered data values. Lock generator 78 computes a sliding average of the second phase error signals based on a relatively large number of samples. For example, lock generator 78 can comprise an accumulator that accumulates the error signals output from phase detector 76 for one thousand samples of the filtered data output from filter 70. In the event a particular data coordinate set output from adaptive filter 70 represents a point that falls within a predetermined area of the constellation pattern, the phase detector 76 can output a second phase error signal that is, e.g., a "+1". On the other hand, if the data coordinates represent a point falling outside of the predetermined area in the constellation pattern, a "−1" can be output as the second phase error signal. If the last one thousand error signal samples input to lock generator 78 have an average value of, say, zero or above, lock generator 78 will output the carrier lock signal to actuate error signal generator to switch from the CMA mode to the DDA mode.

FIG. 7 illustrates a preferred embodiment of the phase error detection scheme (i.e., the second quantization scheme) used to generate the second phase error signals that are output from phase detector 76. In the illustrated embodiment, 16-QAM is used to transmit the data. Accordingly, constellation pattern 120 includes sixteen points. Each point is surrounded by a predetermined elliptical area, such as areas 126 and 132 illustrated. Ellipse 126 surrounds constellation point 122, and is aligned with a corresponding radius 124 extending from the origin of the constellation pattern to the constellation point 122. Similarly, ellipse 132 surrounds constellation point 128, and is aligned with a radius 130 extending from the constellation pattern origin to point 128. Similarly aligned elliptical areas (not shown) are defined around each of the other points of the constellation pattern.

In the event a received data point falls within one of the ellipses, the phase detector PROM 76 will output an error signal having the amplitude "1". In the event that a received data point does not fall within any of the ellipses defined around the constellation points, a "−1" error signal will be output from phase detector 76. Once a certain percentage of "1" error signals are received, lock generator 78 will declare a lock and output the carrier lock signal to error signal generator 72.

As an example, in a 16-QAM system wherein elliptical areas are used as shown in FIG. 7, the ratio of the major axis of the ellipse to the minor axis of the ellipse can be chosen to be 29:20 on a grid having axes running from −128 to +128, with 0-128 corresponding to signal amplitudes of 0-4. The ratio of the area inside the ellipses to the total area can be approximately 40%. A lock is declared when 50% of the incoming data falls within the 40% of the total area defined by the ellipses. It is noted that the specific areas and percentages chosen will vary for different applications. If the areas chosen are too big, false locks will occur Conversely, if the areas chosen are too small, the system will not lock as soon as it should, and may not lock at all. It is further noted that the shapes of the areas surrounding the constellation points do not have to be ellipses. Other shapes such as circles or squares can be defined Computer simulation of the invention has verified its effectiveness in improving the performance of a complex adaptive equalizer. In the simulation, the transmission system was 16-QAM at a symbol rate of 5 MHz, with additive white Gaussian noise (AWGN) and multipath distortion. The carrier was offset by 500 Hz in frequency and 45 degrees in phase. The carrier-to-noise ratio (C/N) was 30 dB, and the multipath had a reflected ray delayed by 10 microseconds, which was down −6 dB from the direct ray. A 256 complex tap fractional spaced equalizer was used. The PLL noise bandwidth was set at 50 KHz with a damping factor of 2 (at C/N = 30 dB). The simulation results are illustrated in FIGS. 4, 5 and 6.

FIGS. 4a to 4c illustrates the scatter plots of the simulated data at the output of the adaptive equalizer at various times. Scatter plot 90 shows the data as initially received. Scatter plot 92 shows the data just after the CMA mode of operation ends, and the DDA starts Scatter plot 94 illustrates the output of the equalizer at the end of the simulation. As the scatter plots of FIGS. 4a to 4c illustrate, the combination of the initial CMA mode and carrier recovery PLL work to clean up the scatter plot, so that the DDA mode of operation can take over.

FIG. 5 shows the mean square error (MSE) generally designated 96 out of the adaptive equalizer. FIG. 6 illustrates the carrier lock signal, generally designated 104, provided by the lock generator. Lock occurred at the zero crossing 110 after approximately 10,000 symbols were received. As indicated at 108, the lock signal was steady once it was generated. As indicated in FIG. 5, convergence under the CMA mode of operation, as indicated at 98, was acceptable. After lock occurred at 102, the convergence was improved by use of the DDA mode of operation.

It should now be appreciated that the present invention provides a method and apparatus for recovering carrier phase in systems employing adaptive equalization, without the use of a phase rotator or phase de-rotator. This is achieved by locating the adaptive equalizer inside of the carrier recovery loop A blind equalization algorithm, such as CMA is used to initially adjust the equalizer coefficients in the absence of carrier phase recovery, reducing the acquisition time of the system. This occurs without the use of an equalizer training sequence, which reduces the complexity of the system design. A carrier lock signal is used to determine when to switch from the blind equalization algorithm to a decision directed algorithm to complete the convergence of the adaptive equalizer and phase locked loop. Thus, it is not necessary to wait for carrier recovery to occur while equalizing the received data.

Although the invention has been described in connection with a preferred embodiment thereof, those skilled in the art will appreciate that numerous adaptations and modifications may be made thereto, without departing from the spirit and scope of the invention as set forth in the claims

What is claimed is:

1. A method for adaptively equalizing data signals in a communications receiver comprising the steps of:
   demodulating an unequalized data signal;
   filtering said demodulated data signal in an adaptive equalizer that initially updates adaptive filter coefficients using error signals derived from a first coefficient update algorithm;
   generating a carrier lock signal when a phase error of a filtered signal output from said adaptive equalizer reaches a threshold value; and
   updating said adaptive filter coefficients in said adaptive equalizer using error signals derived from a second coefficient update algorithm instead of said first algorithm in response to said carrier lock signal.

2. A method in accordance with claim 1 comprising the further steps of:

monitoring said phase error during the operation of said adaptive equalizer; and returning to said first algorithm if it is determined during said monitoring step that said phase error no longer meets said threshold.

3. A method in accordance with claim 1 wherein said first algorithm is a self recovering equalization algorithm.

4. A method in accordance with claim 3 wherein said self recovering equalization algorithm is a constant modulus algorithm.

5. A method in accordance with claim 3 wherein said second algorithm is a decision directed algorithm.

6. A method in accordance with claim 1 wherein said threshold value is reached when at least a minimum percentage of samples of said filtered signal taken over time fall within a predetermined range.

7. A method in accordance with claim 6 wherein:

said demodulated data signal comprises coordinates representing an N-point constellation pattern for a demodulated N-bit quadrature amplitude modulated signal; and said range comprises a plurality of separate fixed areas, each area enclosing one of the points in said constellation pattern.

8. A method in accordance with claim 7 wherein each of said separate fixed ares comprises an ellipse surrounding one of the points in said constellation pattern, each ellipse being aligned with a corresponding radius extending from an origin of said constellation pattern to the point the ellipse surrounds.

9. An adaptive equalizer for a communications receiver comprising:

means for demodulating an unequalized data signal;

an equalizer loop containing a filter coupled to receive demodulated data from said demodulating means, an error signal generator coupled to receive filtered data from said filter, and means responsive to error signals from said error signal generator for updating coefficients for input to said filter;

a carrier recovery loop comprising a phase detector coupled to receive said filtered data and provide a first phase error signal for controlling said demodulating means; and means, coupled to receive a second phase error signal from said phase detector, for generating a carrier lock signal when said second phase error signal meets a threshold;

wherein said error signal generator is responsive to said carrier lock signal for generating error signals from a first coefficient update algorithm when said second phase error signal fails to meet said threshold and for generating error signals from a second coefficient update algorithm when said second phase error signal meets said threshold.

10. An equalizer in accordance with claim 9 wherein said error signal generator comprises a memory storing a first set of error signals computer using said first algorithm and a second set of error signals computed using said second algorithm 11. An equalizer in accordance with claim 10 wherein said filtered data and said carrier lock signal are used to address said memory to output error signals.

12. An equalizer in accordance with claim 11 wherein said first algorithm is a self recovering equalization algorithm 13. An equalizer in accordance with claim 12 wherein said self recovering equalization algorithm is a constant modulus algorithm 14. An equalizer in accordance with claim 12 wherein said second algorithm is a decision directed algorithm.

15. An equalizer in accordance with claim 9 wherein said phase error threshold is met when at least a minimum percentage of samples of said filtered data taken over time fall within a predetermined range.

16. An equalizer in accordance with claim 15 wherein:

said demodulated data signal comprises coordinates representing an N-bit point constellation pattern for a demodulated N-bit quadrature amplitude modulated signal; and said range comprises a plurality of separate fixed areas, each enclosing one of the points in said constellation pattern.

17. An equalizer in accordance with claim 16 wherein each of said separate fixed areas comprises an ellipse surrounding one of the points in said constellation pattern, each ellipse being aligned with a corresponding radius extending from an origin of said constellation pattern to the point the ellipse surrounds.

18. An adaptive equalizer for a communications receiver comprising:

an adaptive filter for filtering unequalized data representative of coordinates in a constellation pattern;

an error signal generator for converting filtered data from said filter to error signals based on a first or second coefficient update algorithm;

means coupled to receive error signals output form said error signal generator for updating coefficients for said adaptive filter;

a phase detector for converting said filtered data to phase error signals; and means responsive to said phase error signals for controlling said error signal generator to provide error signals according to said first coefficient update algorithm when a phase error represented by said phase error signals is above a predetermined threshold and to provide error signals according to said second coefficient update algorithm when said phase error is below said predetermined threshold.

19. An equalizer in accordance with claim 18 wherein said error signal generator comprises a look up table containing error signal data computed under said first and second algorithms and addressed by said filtered data and said control means to output said error signals.

20. An equalizer in accordance with claim 18 wherein said phase detector comprises a look up table containing phase error data and addressed by said filtered data to output said phase error signals.

* * * * *